(12) United States Patent
Palmer

(10) Patent No.: US 6,344,539 B1
(45) Date of Patent: Feb. 5, 2002

(54) PROCESS FOR CRYSTALLIZATION POLYESTER GRANULES

(76) Inventor: Walter M Palmer, 100 Crestview Dr., Apt. #1, Greeneville, TN (US) 37745

( * ) Notice: Subject to any disclaimer, the term of this patent is extended or adjusted under 35 U.S.C. 154(b) by 0 days.

(21) Appl. No.: 09/535,822

(22) Filed: Mar. 28, 2000

(51) Int. Cl.⁷ .................................................. C08F 6/00
(52) U.S. Cl. ....................... 528/481; 528/483; 528/492; 528/503
(58) Field of Search ................................ 528/481, 483, 528/492, 503

(56) References Cited

U.S. PATENT DOCUMENTS

| | | | | |
|---|---|---|---|---|
| 4,064,112 A | * | 12/1977 | Rothe et al. | |
| 4,161,578 A | * | 7/1979 | Herron | 528/272 |
| 4,731,281 A | * | 3/1988 | Fleischer et al. | 428/196 |
| 5,119,570 A | * | 6/1992 | Russemeyer et al. | 34/10 |
| 5,714,571 A | * | 2/1998 | Al Ghatta et al. | 528/308.2 |
| 5,744,074 A | * | 4/1998 | Stouffer et al. | 264/8 |
| 5,919,872 A | * | 7/1999 | Tung et al. | 525/439 |

* cited by examiner

*Primary Examiner*—Samuel A. Acquah

(57) ABSTRACT

This invention discloses a process for crystallizing polyester granules having a bi-component structure consisting of a thin crystalline skin and an essentially amorphous interior. The crystalline skin prevents the granules from sticking together in hot post-crystallization processes such as solid state polymerization or melt extrusion. The amorphous interior of the polyester granules facilitates a melt extrusion process by allowing lower melt temperatures and extruded products of improved uniformity.

9 Claims, No Drawings

PROCESS FOR CRYSTALLIZATION POLYESTER GRANULES

FIELD OF THE INVENTION

This invention relates to an improved process for crystallizing amorphous polyester granules of any shape or size so that the granules do not stick together in a subsequent process such as solid state polymerization. The granules crystallization process of this invention is also a useful pre-treatment to facilitate a melt extrusion process and provide more uniform extruded products.

BACKGROUND OF THE INVENTION

In searching the Prior Art for this invention it is useful to note that:

(1) Polyester Granules are also described in Pellets, Chips or Particulate Polyester with at least one dimension of the solid particle greater than one millimeter.

(2) Some crystallization of polyester granules may take place in processes such as Drying, Heat Setting, Annealing or a Heat Process used to achieve Dimensional Stability.

(3) The Polyester Granules of this invention are Polyethylene Terephthalate or simply PET.

One method of preventing granules sticking together discussed in the prior art involves coating the granule surfaces with some "non-stick" material.

U.S. Pat. No. 3,544,523 (Mobil Oil) teaches that polyester granules may be prevented from sticking together by coating the granules with a small amount of powdered anti-caking agent such as talc.

U.S. Pat. No. 5,919,872 (Shell) adds an alkylene carbonate to the polyester to reduce the tendency of the polyester pellets to stick to-gether in a solid state polymerization process in which the pellets are not agitated.

My U.S. Pat. No. 4,731,281 (Fleischer & Palmer) describes a process for encapsulating polyester monofilaments with a coat of an anti-sticking polymer such as an addition of 0.5% of a fluorocarbon polymer to the surface of the monofilaments. This coating process may be used to coat the polyester strands (spaghetti) prior to cutting into pellets.

All of the above three prior art patents use an additive to the PET which may not be suitable in subsequent processes. For example the additive may tend to block the orifices in a die or spinneret. Additionally the additive may be detrimental to the performance of the extruded product (e.g. soft-drink polyester bottles.) It is therefore of interest to use granule crystallization processes that use only heat, and no additive, to achieve non-stick properties of the PET granules.

DISCUSSION OF THE PRIOR ART

A simple Drying Process of PET granules at 150° C. for one hour will produce some crystallinity in the granules. However the granules may still stick together and aggregate in a lump if the granules are subjected to a post-crystallization process above 150° C. without provision of stirring or agitation of the PET granules.

U.S. Pat. No. 4,161,578 (Bepex) describes a crystallization process for PET granules in which temperatures in a range 180° C. to 220° C. are used with residence times in the crystallizer of less than 0.5 hour. This higher temperature process may prevent PET granules from sticking together in the heated hopper or the compacting zone of a screw extruder. However, contrary to the claims of '578 patent, a crystallization temperature of 220° C. may not be high enough to prevent PET granules sticking together in some Solid State Polymerization Processes where the granules reach 230° C. without agitation. One feature of patent '578 is that crystallization of PET granules of different sizes were investigated.

U.S. Pat. No. 4,064,112 (Zimmer/Eastman) addresses the problem of crystallizing PET granules so that they do not stick together in a solid state polymerization process operating at 230° C. without granule agitation. Patent '112 describes a process for crystallizing PET granules at 230° C. for 0.5 to 3 hours. Patent '112 teaches that the crystallization temperature should be equal to, or higher, than the solid-stating temperature. This procedure of patent '112 is consistent with the Heat Setting Technology of Polyester Yarns and Fabrics which states that to obtain good Dimensional Stability of a textile structure it is necessary to heat set or anneal the structure at a temperature equal to, or higher, than the temperature it is exposed to in a subsequent process or in normal end use. However due to the long residence time, typically an hour or more, of process '112 it is necessary to use hot nitrogen in the crystallizer (instead of hot air) to prevent degradation of the PET granules. Additionally patent '112 crystallizes the PET granules throughout their volume which requires higher temperatures in a subsequent extrusion process.

U.S. Pat. No. 5,714,571 describes a process for crystallization of PET resins in a fluid bed crystallizer where the nitrogen fluidizing gas enters the crystallizer at a temperature not lower than 195° C. The residence time of the granules in the fluid bed crystallizer is higher than 5 minutes. Since Eng. owns '571.

U.S. Pat. No. 5,744,074 (Du Pont) produces PET polymer from an amorphous polyester melt. Crystallization temperatures as high as 230° C. are quoted. Whilst very short residence times are mentioned in '074, one objective was to achieve a more uniform crystallization throughout each PET pellet.

U.S. Pat. No. 5,119,570 (Buhler AG) does suggest a stage of polyester crystallization in which the granule is "crystallized in part and has a fraction of amorphous material." '570 uses 2 fluid beds.

The Prior Art of Crystallizing PET Granules may be summarized by considering the following process conditions or process features:

(1) Temperatures of 230° C. or higher
(2) Short Residence Time in Crystallizer (less than 10 minutes for small PET granules).
(3) Use of hot air instead of the more expensive Nitrogen
(4) Production of a bi-component PET granule with a crystalline skin and essentially amorphous interior.
(5) Use of PET granules which facilitate the melt extrusion process.

TABLE 1

| Patent Number U.S. Pat. No. | Assignee | High Temp | Short Residence Time | Air not Nitrogen | Bi-Comp. PET Granule | Easier Melt Extrusion |
|---|---|---|---|---|---|---|
| Drying | | No | No | No | No | No |
| 4,161,578 | Bepex | No | No | No | No | No |
| 4,064,112 | Zimmer | Yes | No | No | No | No |
| 5,714,571 | Sinco | No | Yes | Yes | No | No |
| 5,744,074 | Du Pont | Yes | Yes | Yes | No | No |
| 5,119,570 | Buhler | No | Yes | Yes | Yes | no |
| This Invention | | Yes | Yes | Yes | Yes | Yes |

In addition to preventing the PET granules from sticking together, Prior Art has recognized the importance of using a PET granule Crystallization Process which facilitates post-crystallization processes and/or improves the quality of the products extruded from the crystallized PET granules.

For example:

(1) U.S. Pat. No. 4,064,112 teaches that the use of higher solid state temperatures, without the PET granules sticking together, increases solid-state polymerization productivity.

(2) U.S. Pat. No. 5,843,573 (Nippon) teaches the production of a polyester resin composition which "eliminates a precise temperature control during a molding pressure, and saves labor force resulting in desirable moldability and productivity.

(3) My U.S. Pat. No. 5,753,168 (Palmer) recognized the importance of having a PET granule which could be used in a melt extrusion process capable of producing polyester monofils of very uniform diameters.

As shown in the Table above the only crystallization process capable of preventing the PET granules sticking together and providing improved post-crystallization processes and products is the Crystallization Process used in this Invention.

SUMMARY OF THE INVENTION

The central idea of this invention is to produce a bi-component PET granule with a thin layer of crystallized PET at the surface of the granule and essentially amorphous PET in the interior of the granule.

The crystalline "skin" prevents the PET granules from sticking together in any hot post-crystallization process even if the latter has no provision for agitating or stirring the granules.

The bi-component granule is obtained by using hot air in the crystallizer at temperature of 230° C. or higher. The crystallization temperature is adjusted to be equal to, or higher than the temperature used in a solid state polymerization process.

The Residence Time in the crystallizer is very short from 2 to 20 minutes depending on the size and shape of the granules.

The crystallization process may be used without increasing the viscosity of the PET granules in a solid state polymerization process. The PET granules with amorphous PET in its interior are suitable for molding or extrusion processes and allow lower extrusion temperatures.

One feature of this invention is that a simple procedure has been developed to obtain the desired bi-component structure for PET granules of different sizes and shapes.

An important step in obtaining a bi-component PET granule with a crystalline "skin" and an amorphous central region is to specify the suitable Residence Time in the crystallizer for PET granules of different sizes and shapes. To determine the Residence Time for any particular PET granule it is convenient to define and measure a quantity known as:

$T_{VA}$=The Volume Average Temperature of the PET granule

To define $T_{VA}$ we divide the granule into a number "n" of sub-volumes. The Temperature of the first Volume 1 is $T_1$. The Temperature of the second Volume 2 is $T_2$, etc etc $$T_{VA} = \frac{T_1 V_1 + T_2 V_2 + T_3 V_3 \ldots T_n V_n}{V_1 + V_2 + V_3 \ldots V_n}$$

For most shapes it is sufficient to consider about n=10 sub-volumes. The sub-volumes do not have to be the same size.

$T_{VA}$ may be measured simply and accurately by catching a sample, say 2 kgs, of the hot granules in an insulated vessel or bucket as they exit the crystallizer. A temperature sensing device, thermometer or thermocouple, is placed in the center of the sample of hot granules. After several minutes (10 or 20) the temperature levels off to a constant value and this is $T_{VA}$. It is important that the vessel used to catch the hot granules is well insulated with a vacuum jacket so that no heat is lost from the granules until the measurement of $T_{VA}$ is completed.

It is content to consider a spherical PET granule of diameter 2 mm and radius 1 mm. It is then possible to suggest a typical temperature profile from the center of the granule to the outer surface of the granule.

The outer surface of the granule will have a temperature close to the temperature of the hot air in the crystallizer as it exits the crystallizer. The residence time of the granule in the crystallizer may be so short the center of the granule may have a temperature only a little higher than the temperature of the granules entering the crystallizer.

We can divide the spherical granule into 10 sub-volumes consisting of a small sphere of radius 0.1 mm in the center of the granule and 9 hollow spherical shells each of thickness 0.1 mm. As the granule exits the crystallizer the granule may have a temperature of 30° C. in the center and 230° C. on its outer surface.

In the following Table 2 we suggest a typical temperature for each of the sub-volumes. The temperature increases as we move away from the center of the granule.

In addition we calculate the volume of each spherical shell as a fraction of the total volume of the granule. Clearly these sub-volumes increase in volume as we move away from the center of the granule.

Finally we calculate the $T_{VA}$ in the last column of the Table by adding up the 10 V T products. In the example considered the $T_{VA}$ is 130° C. In practicing this invention we measure $T_{VA}$ for 2 or 3 Residence Times and choose a Residence Time to give a $T_{VA}$ close to 130° C.

TABLE 2

| Sub-Volume # | | Distance Range from Center mm | Volume Fraction V | Average Temperature T | Product VT |
|---|---|---|---|---|---|
| 1 | sphere | 0.0–0.1 | 0.001 | 30 | 0.03 |
| 2 | | 0.1–0.2 | 0.007 | 32 | 0.2 |
| 3 | | 0.2–0.3 | 0.019 | 35 | 0.7 |
| 4 | | 0.3–0.4 | 0.037 | 40 | 1.5 |
| 5 | | 0.4–0.5 | 0.061 | 50 | 3.0 |
| 6 | spherical shells | 0.5–0.6 | 0.091 | 70 | 6.3 |
| 7 | | 0.6–0.7 | 0.127 | 90 | 11.4 |
| 8 | | 0.7–0.8 | 0.169 | 120 | 20.2 |
| 9 | | 0.8–0.9 | 0.217 | 150 | 32.5 |
| 10 | | 0.9–1.0 | 0.271 | 200 | 54.2 |
| | | Sums | 1.000 | $T_{VA}$ | 130° C. |

Similar calculations may be made for granules in the shape of cubes, cylinders of circular or square cross-sections, and pancake-shaped platelets. The sub-volumes and temperature profiles of spherical granules and cubical granules are similar.

The main point to consider in the crystallization process is that if the surface temperature of a granule of any shape is 230° C. and its Volume Average Temperature is 130° C. then the center of the granule is not heated up very much for any length of time. The interior of the granule of any shape remains essentially amorphous.

ADVANTAGES OF THIS INVENTION

1. The very low Residence Times (2 to 20 minutes) allows high rates of production of bi-component PET granules even if the crystallizer is small and holds only 10 kilograms of granules.
2. It is much easier to design a stirrer or other means of agitating the granules if the crystallizer is small.
3. The very short Residence Times allows the granules to be heated with hot air at 230° C. instead of using the more expensive Nitrogen.
4. The crystalline skin of at least 0.1 millimeters thickness prevents the PET granules from sticking together in any post-crystallization process at 230° C. or lower temperatures even if there is little or no agitation of the granules.
5. The amorphous interior of the bi-component granules of this invention allows lower melt temperatures to be used in such post-crystallization processes as Molding or Screw Melt Extrusion. Melt temperature some 5° C. higher are required in the prior art when the center of the granule is crystalline
6. With no additives to the PET granules and easier melt extrusion, the use of the bi-component granules of this invention leads to extruded products of better quality and uniformity.
7. By measuring $T_{VA}$ for 2 or 3 different Residence Times it is possible to choose a suitable Residence Time to obtain $T_{VA}$ close to 130° C. for any size or shape of PET granules.

I claim:

1. A process for manufacturing PET granules with a bi-component structure consisting of a thin crystalline skin and amorphous interior, said process comprising the steps of:

(a) Introducing amorphous PET granules at Room Temperature into a Crystallizer.
    (b) Providing the Crystallizer with a stirrer or some device to agitate the granules in the crystallizer as they heat up,
    (c) Using hot air at 230° C. circulating in the Crystallizer
    (d) Using a Residence Time in the Crystallizer to obtain a Volume Average Temperature, $T_{VA}$, between 120° C. and 140° C. for the granules leaving the Crystallizer,
    (e) Allowing the PET granules to cool down to Room Temperature.

2. The process of claim 1 wherein the PET granules are cubical in shape with dimensions between 1 mm×1 mm×1 mm and 5 mm×5 mm×5 mm.

3. The process of claim 1 wherein the PET granules are spheres of diameters between 1 mm and 5 mm.

4. The process of claim 1 wherein the PET granules are long cylinders of length less than 10 mm and circular or square cross-section of maximum dimension less than 5 mm.

5. The process of claim 1 wherein the PET granules are pancake-like platelets of diameters more than 3 mm and thickness less than 3 mm.

6. The process of claim 1 wherein the PET granules have an irregular shape with a volume between 1 and 125 cubic millimeters.

7. The process of claim 1 in which the bi-component granules are solid stated, without sticking together, in a Polymerizer without granule agitation, using polymerization temperatures from 200° C. to 230° C.

8. The process of claim 1 in which the bi-component PET granules are processed in a heated hopper and a screw melt extruder without sticking together in a lump in the hot hopper or the compacting, first zone, of the screw extruder.

9. The process of claim 7 in which the PET granules with an amorphous interior are processed in a Screw Melt Extruder at PET polymer temperatures up to 5° lower than the extrusion temperature required to process PET granules with crystalline interiors.

* * * * *